| United States Patent [19] | [11] Patent Number: 4,639,240 |
|---|---|
| Liu | [45] Date of Patent: Jan. 27, 1987 |

[54] CHAINGUARD

[75] Inventor: King Liu, Taichung Hsen, Taiwan

[73] Assignee: Schwinn Bicycle Company, Chicago, Ill.

[21] Appl. No.: 797,868

[22] Filed: Nov. 14, 1985

[30] Foreign Application Priority Data

May 1, 1985 [TW] Taiwan .............................. 74203323

[51] Int. Cl.$^4$ ............................................. B62J 13/00
[52] U.S. Cl. ..................................... 474/144; 403/344
[58] Field of Search ................ 474/144; 248/229, 230;
403/344, 234, 386, 398

[56] References Cited

U.S. PATENT DOCUMENTS

| 671,816 | 4/1901 | Cooley | 474/144 |
| 2,584,788 | 2/1952 | Cich | 474/144 |
| 4,507,105 | 3/1985 | Stottmann et al. | 474/144 |

Primary Examiner—James A. Leppink
Assistant Examiner—Frank H. McKenzie, Jr.
Attorney, Agent, or Firm—McCaleb, Lucas & Brugman

[57] ABSTRACT

A bicycle chainguard having a housing shaped to cover the top run of a bicycle chain with a curved forward end portion extending at least partially around a front sprocket. The housing has a pair of keyhole-shaped through-slots formed in a vertical wall. Clamps encircle seat and down tubes on the frame of the bicycle. Each clamp has a lug extending into a corresponding through-slot. Each lug has a shank with a diameter sized to fit within the through-slot, and an enlarged head sized to pass through an enlarged end portion of the keyhole-shaped through-slot. The longitudinal axis of each through-slot is oriented tranversely to the axis of the corresponding frame tube enabling assembly of the lug in the slot in a wide range of positions along the axial length of the through-slot to accommodate a range of angular orientations of the frame tubes for different model or style bicycles. Preferably, each lug will be off-center on its clamp to extend the range of frame tube angles which can be accommodated by the chainguard.

6 Claims, 10 Drawing Figures

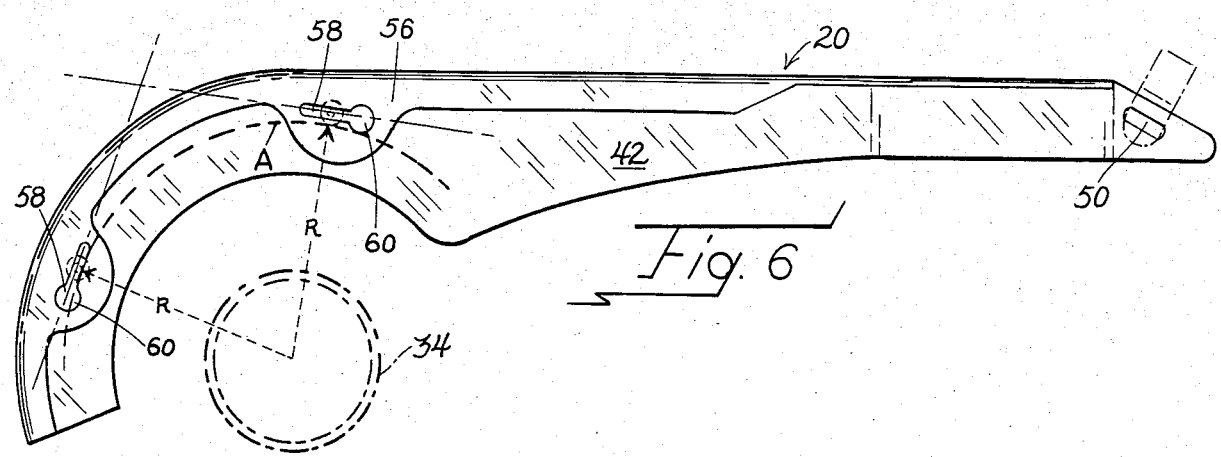
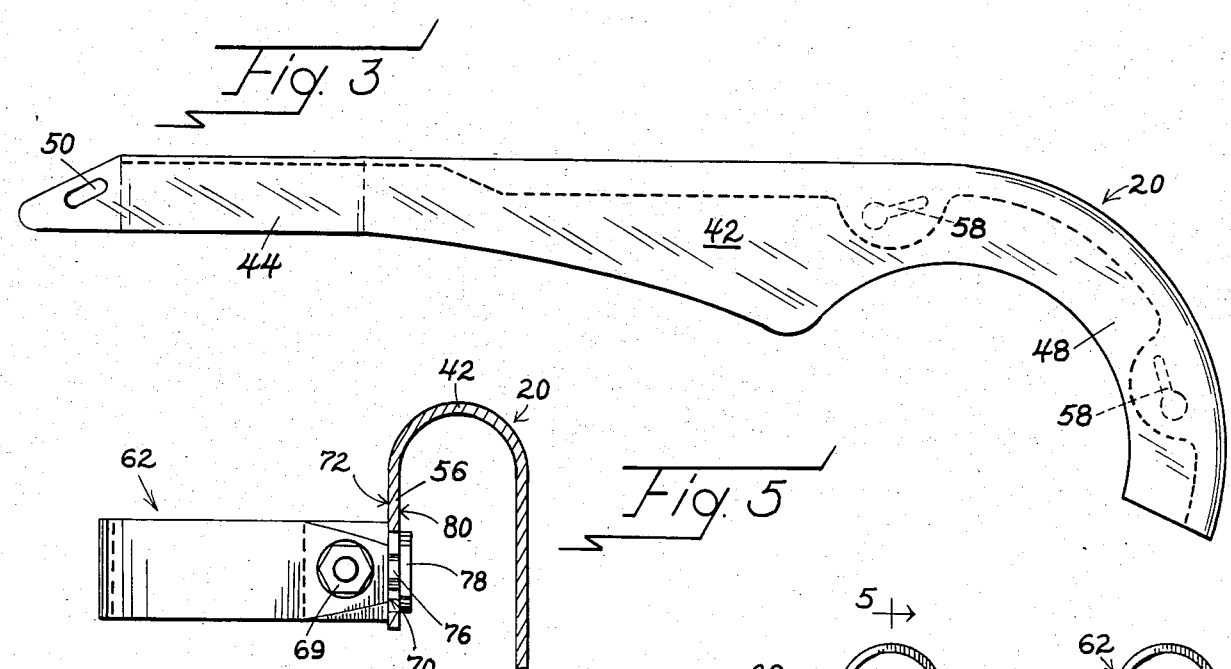

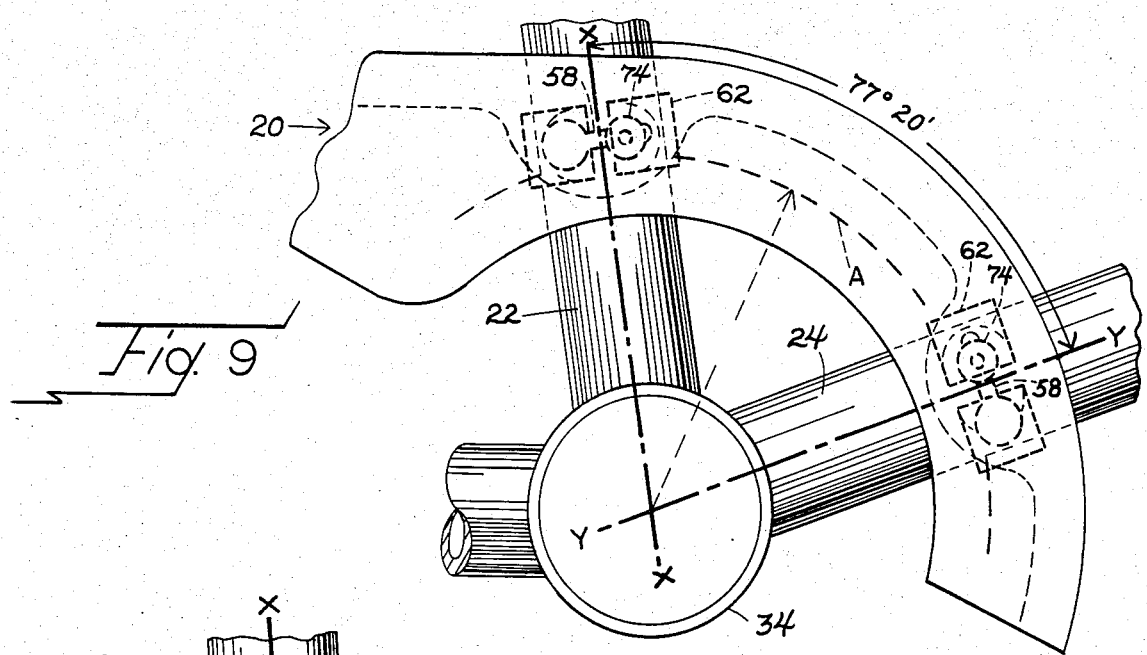
Fig. 9
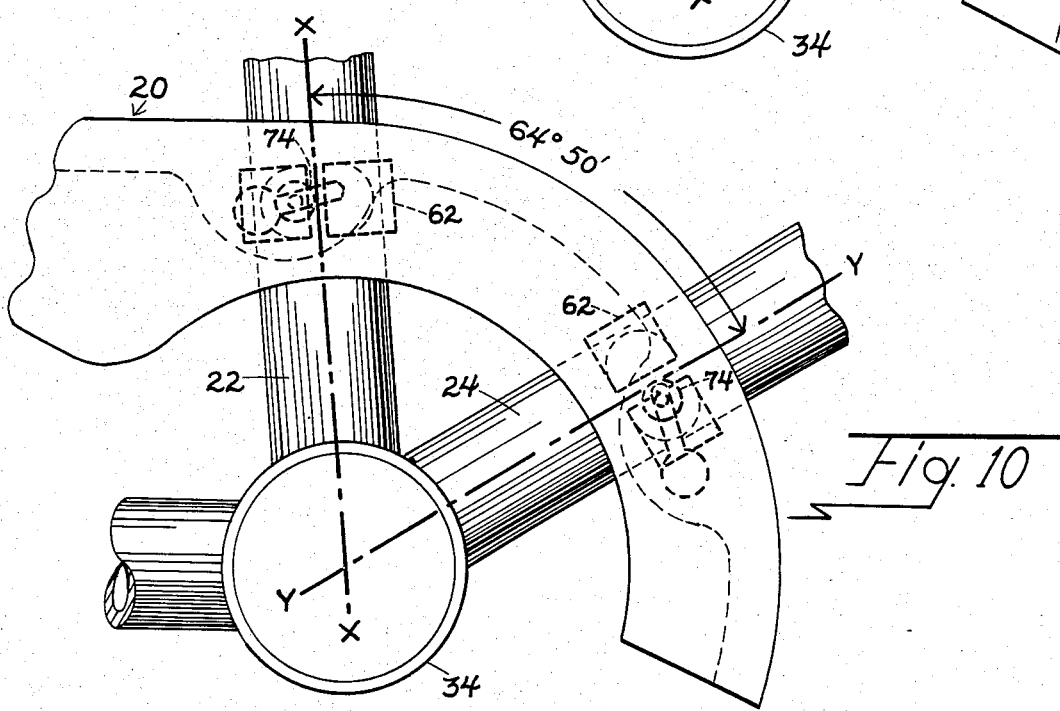
Fig. 10
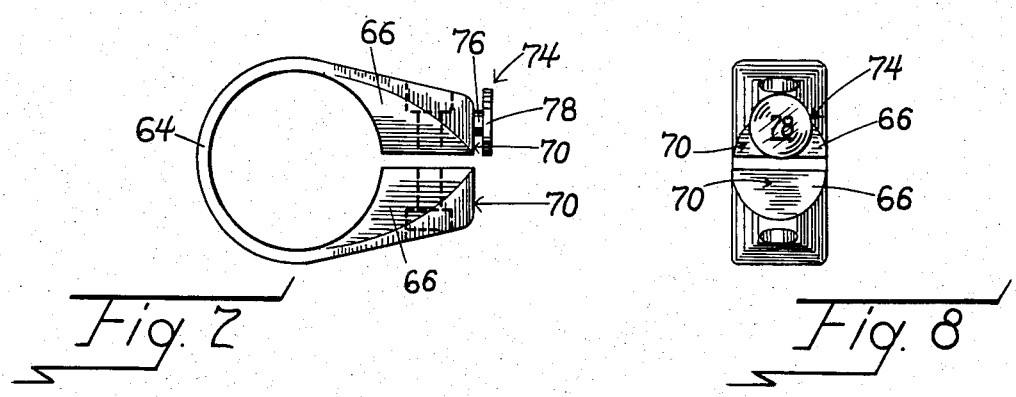
Fig. 7
Fig. 8

CHAINGUARD

BACKGROUND OF THE INVENTION

The present invention relates to chainguards for bicycles and the like.

Conventional chainguards are formed of light gage sheet material extending at least along the top run of the chain and partly around the forward sprocket. Some of these chainguards include mounting holes in registration with mounting brackets welded or bolted to the frame. Others, as described in U.S. Pat. No. 4,507,105, have lugs extending sidewardly into registration with clamps mounted on seat and down tubes of the bicycle frame.

These conventional chainguards which require precise registration between clamps or brackets with fixed connections on the chainguard have a serious disadvantage in that each chainguard is limited to use on one particular bicycle frame, requiring a special chainguard for each size, style or model of bicycle. For example, in the popular BMX style bicycles, there are several models with a range of angular spacings between the seat and down tubes on which the clamps are mounted. Two examples, with spacings of 64° 50' and 77° 20' are illustrated in the attached drawings.

The disparity between clamp positions and the fixed connecting points on the chainguard is often so great that the chainguard can be connected to only one or the other of the seat tube or down tube, not both. For example, in the above mentioned U.S. Pat. No. 4,507,105 only one clamp is shown attached, this being to the seat tube or mast 16. This would provide a weak and unstable connection for many bicycle applications.

Accordingly, there is a need for a chainguard which will fit a plurality of bicycle frames having different angular spacings between the seat and down tubes.

SUMMARY OF THE INVENTION

The present invention provides a chainguard with adjustable clamp connections so a single chainguard can be attached to clamps on the seat and down tubes regardless of a wide range of angular spacings between the tubes.

This invention provides the option of connecting the chainguard to both the seat and down tubes, or either, depending on the strength and stability required.

The chainguard of the present invention includes a housing with a forward portion curving around a frame sprocket and a vertical wall alongside at least one frame tube, a through-slot in the housing wall, a clamp adapted to encircle the frame tube, and a headed lug extending outwardly from the clamp and engaging the through-slot.

A feature of the invention is that each through-slot is oriented transversely to the axis of the adjacent frame tube enabling a corresponding clamp to be positioned in a range of connected positions along the length of the through-slot to accommodate a range of angular positions of each frame tube, and a range of angular spacings between the tubes.

Another feature of the invention is that the axes of the through-slots intersect one another at a substantial angle in the order of 90° to minimize play.

Another feature of the invention is that the lug on each clamp is eccentrically positioned with respect to the center line of the frame tube enabling the lug to be located in two optional off-center positions by simply rotating the clamp 180°, to thereby increase the range of permitted angular positions of each frame tube, and the range of angular spacings between the frame tubes, which can be accommodated by a single chainguard.

Other objects and advantages of the invention will be apparent from the following description, the accompanying drawings, and the appended claims.

BRIEF DESCRIPTION OF THE DRAWINGS

FIG. 3 is a right side view of the chainguard housing;

FIG. 4 is a top view of FIG. 3;

FIG. 5 is a vertical cross-sectional view of FIG. 4 taken along the line 5—5;

FIG. 6 is a left side view of the chainguard housing;

FIG. 7 is a top view of one of the clamps;

FIG. 8 is an end view of FIG. 7;

FIG. 9 is an enlarged side view of the forward end section of the chainguard of the present invention clamped to a bicycle frame having a particular angular spacing between the seat tube and down tube; and FIG. 10 is a view similar to FIG. 9 showing the chainguard connected to the frame of a bicycle having a different angular spacing between the seat tube and down tube.

DETAILED DESCRIPTION OF THE PREFERRED EMBODIMENTS

Figure 1:
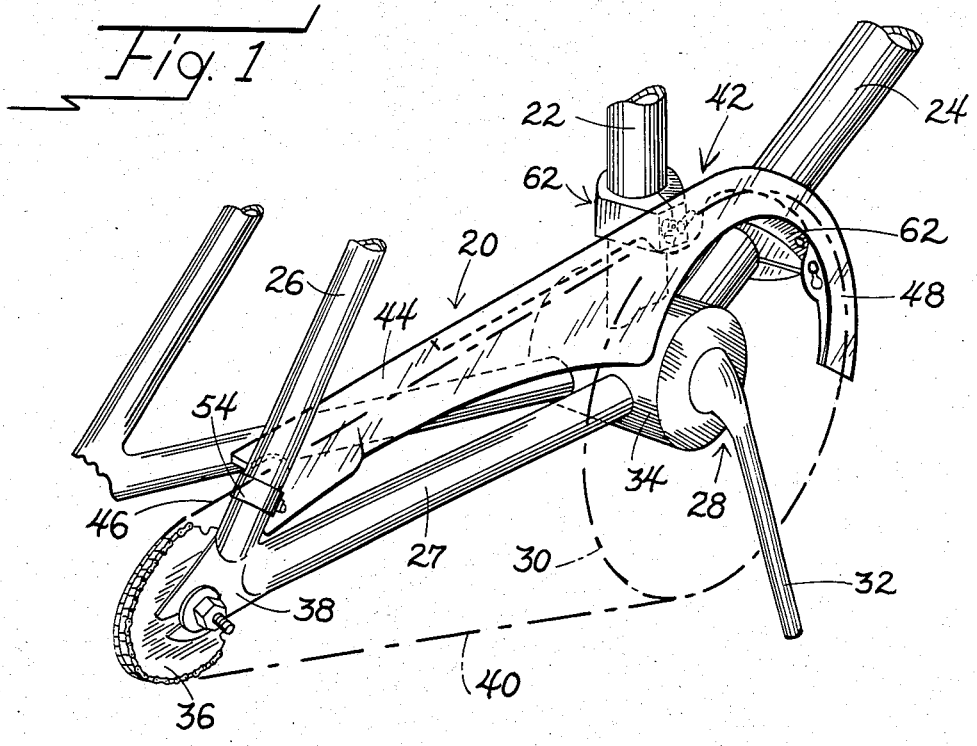
FIG. 1 is a perspective view of the chainguard of the present invention mounted on a portion of a bicycle frame.

Referring first to FIG. 1, the bicycle chainguard of this invention, generally designated 20, is made to be mounted on the seat tube 22, down tube 24 and one of the seat stays 26. A bicycle crank assembly 28 includes a front drive sprocket 30 (schematically shown) and a pedal assembly 32 (fragmentarily shown) journaled in a crank housing 34. A rear driven sprocket 36 is mounted on a rear wheel (not shown) which is rotatably journaled on the frame between a pair of rear end fitments 38. A chain 40 interconnects the sprockets.

The chainguard comprises a downwardly open, generally channel-shaped housing 42 made of metal or rugged plastic sheet material such as polycarbonate. It has a rear section 44 sized to extend along the top run 46 of the chain and a curved forward section 48 adapted to extend at least partially about the front sprocket 30. The rear section 44 has a slot 50 for a bolt 52 connecting a retainer clip 54 of standard design. The clip is sized to grip the righthand seat stay 26 as shown or, alternatively, to the righthand chain stay 27. The forward curved end section 48 is sized to extend at least partially around the front sprocket 30.

The chainguard housing 42 has an inner vertical wall 56 (FIGS. 5 and 6) on the left side of the chain. It lies alongside the seat tube 22 and down tube 24 and has two keyhole-shaped through-slots 58, 58, each with an enlarged end portion 60. As best shown in FIGS. 9 and 10, the through-slots are oriented tranversely to the axes X—X and Y—Y of the corresponding frame tubes 22, 24. As shown is FIGS. 6 and 9, the through-slots 58 are also substantially tangent to a circular arc struck from the center of the crank arm housing.

Figure 2:
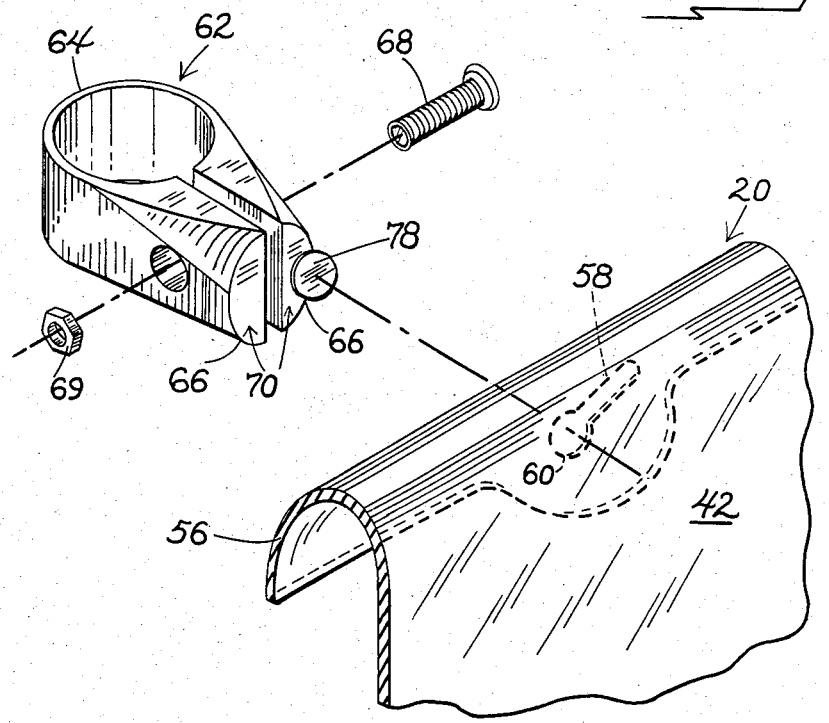
FIG. 2 is an exploded perspective view of one of the clamps shown in FIG. 1 together with a portion of the chainguard housing.

A pair of clamps 62, 62 preferably made of sturdy, flexible plastics material such as nylon are sized to grip the seat and down tubes 22 and 24. Each clamp has an arcuate central section to encircle the respective tube and a pair of opposed, adjacent end sections 66 with a bolt 68 for securing them together to grip the tube. The clamp end sections have a pair of coplanar end surfaces 70, 70 (FIGS. 2, 7, and 8) which are made to abut the inside wall surface 72 (FIG. 5) adjacent each through-slot 58.

As best shown is FIGS. 7 and 8, a lug 74 extends forwardly from one of the end surfaces 70 of each clamp. Each lug comprises a shank 76 and an enlarged head 78. The diameter of each shank is sized to fit through the corresponding slot 58 and each head is sized to pass through the enlarged end portion 60 and engage the inside surface 80 of the wall 56 as shown in FIG. 5. The axial length of the shank 76 is substantially the same as the thickness of the wall 56 to thereby provide a snug fit of that wall between the clamp end surface 70 and the underside of the corresponding head 78. The close fit between these parts is shown in FIG. 5. As stated above, and shown particularly in FIGS. 6, 9, and 10, the longitudinal axes of the through-slots 58 cross one another at a substantial angle, approaching 90°, thereby providing a snug, rattle-free support in all directions in a vertical plane while enabling ready assembly and removal of the chainguard from the clamps after first disconnecting the rear clip 54 and shifting the chainguard to a first position in which one of the heads 78 can pass through a slot enlargement 60, and then shifting the chainguard to another position where the other head will pass through its corresponding slot enlargement 60.

An important feature of the invention is that the lugs 74 are *eccentrically* positioned on the respective clamps. This enables each lug to be located in two optional off-center positions simply by reversing the clamp 180°. This increases the range of angular orientation of the seat and down tubes 22, 24, providing four different combinations of lug positions at different angular spacings as follows:
1. Minimum angular spacing of lugs 74, 74 as shown in FIG. 9 where one lug is clockwise of the seat tube centerline X—X and the other is counterclockwise of the down tube centerline Y—Y;
2. Maximum angular spacing of lugs 74, 74 as shown in FIG. 10 where one lug is counterclockwise of the seat tube centerline X—X and the other is clockwise of the down tube centerline Y—Y;
3. Intermediate angular spacing of lugs 74, 74 (not shown) where both lugs are clockwise of the respective frame tube centerlines X—X and Y—Y; and
4. Another, circumferentially-shifted, intermediate angular spacing of lugs 74, 74 (not shown) where both lugs are counterclockwise of the respective frame tube centerline X—X and Y—Y.

The angular orientation of the seat tube 22 and down tube 24, and the angular spacing between them, vary substantially from one model bicycle to another. Further, there are substantial variations even in the same type bicycle. For example, in the popular BMX style bicycle the angular spacing between the seat and down tubes is as large as 77° 20′ as shown in FIG. 9 and as small as 64° 54′ as shown in FIG. 10. Other BMX models have different, intermediate spacings between the extremes shown in those two figures.

As described above, a single chainguard made in accordance with the present invention will fit all these angular variations between the frame tubes while enabling a positive connection to both frame tubes.

This adaptability to different angular orientations of the frame tubes is achieved by forming the elongated through-slots with their longitudinal axes transverse to the frame tube axes X—X and Y—Y as shown in FIGS. 9 and 10. It will be apparent that the lugs 74 occupy different positions along the through-slots and that an even wider range of frame tube angles may readily be accommodated by modifying the dimensions of the slots, making them longer or shorter or curved or angular.

Further, it will be understood that where maximum structural support and rigidity is not needed, only a single clamp 62 may be used, on either the seat tube 22 or the down tube 24.

Assembly of the chainguard on a bicycle is believed apparent from the above description. Briefly, however, one assembly procedure which is quick and effective would include the following steps:
(A) Mount a clamp 62 on the seat tube 22 and finger tighten the bolt 68;
(B) Mount the other clamp 62 on the down tube and finger tighten the bolt;
(C) Slide the chainguard on the down tube;
(D) Slide the chainguard on the seat tube.
(E) Assemble the chainstay retainer clip 54;
(F) Adjust the chainguard to clear the chain and sprockets; and
(G) Tighten all bolts.

Once assembled as described, the chainguard may be removed for access to the chain and sprockets, without loosening the clamps 62, simply by first disconnecting the retainer clip 54 at the rear and shifting the chainguard until one of the lugs 74 registers with its corresponding keyhole enlargement 60, disconnecting it, then repeating this procedure at the other clamp.

The embodiment of the invention described and shown has been necessarily specific for purposes of illustration. Alternations and modifications will be apparent to those skilled in the art. The aim of the appended claims, therefore, is to cover all variations included within the spirit and scope of the invention.

The embodiments of the invention in which an exclusive property or privilege is claimed are defined as follows:

1. In a chainguard for a bicycle or the like of the type having a housing including a curved forward end portion adapted to extend at least partially about a front sprocket and a rear end portion adapted to extend along the top run of a bicycle chain and having means for attaching said rear end portion to a bicycle frame adjacent a rear sprocket, the improvement comprising:

said housing having a vertical wall adapted to lie alongside at least one frame tube of a bicycle, said wall having at least one through-slot with an enlarged portion therein;

a clamp adapted to encircle a bicycle frame tube and having opposed adjacent end portions with means for securing them together to grip said frame tube;

said clamp end portions having a pair of coplanar end surfaces adapted to abut said wall around said through-slot, a lug extending forwardly from one of said end surfaces;

said lug including a shank and an enlarged head at the end thereof;

said shank sized to fit within said through-slot and having an axial length at least equivalent to the thickness of the wall; and said head being larger in diameter than the width of the through-slot and sized to pass through the enlarged portion thereof;

whereby said clamp is positionable in a range of connected positions of said lug along the length of said through-slot to accommodate a range of angular orientations of the bicycle frame tube relative to said chainguard.

2. In a chainguard, the combination of claim 1 in which the axial length of the shank is substantially the same as the thickness of the housing wall to minimize axial movement of the lug relative to the housing and provide a substantially tight assembly.

3. In a chainguard, the combination of claim 1 in which said lug is eccentrically positioned on the clamp enabling the lug to be located in two optional off-center positions on the bicycle frame tube by reversing the position of the clamp on the frame tube, to thereby increase the range of angular orientations of the bicycle frame tube which can be accommodated.

4. In a chainguard, the combination of claim 1 in which there are two of said through-slots in said vertical wall corresponding respectively with a seat tube and a down tube of a bicycle and there are two clamps as recited in claim 1 respectively engaged therewith and adapted to be mounted on seat and down tubes.

5. In a chainguard, the combination of claim 4 in which the axis of through-slots intersect at a substantial angle to minimize play in all directions in a vertical plane.

6. In a chainguard, the combination of claim 4 in which the forward end portion of the housing is curved about the center of a front sprocket it is adapted to be used with, and the longitudinal axis of each through-slot is substantially tangent to a circular arc struck about said center.

* * * * *

UNITED STATES PATENT AND TRADEMARK OFFICE
CERTIFICATE OF CORRECTION

PATENT NO.  : 4,639,240
DATED       : January 27, 1987
INVENTOR(S) : King Liu

It is certified that error appears in the above—identified patent and that said Letters Patent is hereby corrected as shown below:

Column 3, line 64, change 54' to -- 50' --.

Signed and Sealed this

Twenty-eighth Day of April, 1987

Attest:

DONALD J. QUIGG

Attesting Officer

Commissioner of Patents and Trademarks